US 7,036,628 B2

(12) United States Patent
Wilcox et al.

(10) Patent No.: US 7,036,628 B2
(45) Date of Patent: May 2, 2006

(54) HUNTER'S SAFETY HARNESS FOR TREE STAND

(75) Inventors: Timothy L. Wilcox, North Branch, MI (US); Patrick J. Gorman, White Lake, MI (US); Gerald R. DeMeyer, Rochester, MI (US); William K. King, Shelby Township, MI (US); David R. Arnold, Macomb, MI (US)

(73) Assignee: Key Saftey Systems, Inc., Sterling heights, MI (US)

( * ) Notice: Subject to any disclaimer, the term of this patent is extended or adjusted under 35 U.S.C. 154(b) by 11 days.

(21) Appl. No.: 10/755,576

(22) Filed: Jan. 12, 2004

(65) Prior Publication Data

US 2004/0140158 A1    Jul. 22, 2004

Related U.S. Application Data

(60) Provisional application No. 60/440,958, filed on Jan. 17, 2003.

(51) Int. Cl.
  *A47L 3/04*    (2006.01)
  *A62B 35/00*   (2006.01)
  *A41D 1/00*    (2006.01)
(52) U.S. Cl. .............................. 182/9; 182/3; 119/770; 119/857; 2/94
(58) Field of Classification Search ................ 182/133, 182/3, 5, 6, 7, 9, 187, 135, 136, 20, 116, 188; 119/96, 857, 770; 244/151 R; 2/94, 108; 242/385.3, 383.2, 383.3, 383.4, 383.1
See application file for complete search history.

(56) References Cited

U.S. PATENT DOCUMENTS

| 3,088,438 | A | * | 5/1963 | Oliphant | 119/770 |
|---|---|---|---|---|---|
| 3,865,329 | A | * | 2/1975 | Higbee et al. | 242/383.1 |
| 3,869,021 | A | * | 3/1975 | Sutherland et al. | 182/3 |
| 4,026,494 | A | * | 5/1977 | Tanaka | 242/372 |
| 4,171,795 | A | * | 10/1979 | Bianchi | 182/5 |
| 4,273,215 | A | * | 6/1981 | Leggett | 182/3 |
| 4,567,961 | A | * | 2/1986 | Schoenfeld | 182/3 |
| 4,877,110 | A | * | 10/1989 | Wolner | 182/232 |
| 5,531,292 | A | * | 7/1996 | Bell | 182/3 |
| 5,638,772 | A | * | 6/1997 | Kaufmann et al. | 119/770 |
| 5,738,046 | A | * | 4/1998 | Williams et al. | 119/770 |
| 5,927,431 | A | * | 7/1999 | Klein, Jr. | 182/3 |
| 6,035,966 | A | * | 3/2000 | Lewis | 182/7 |
| 6,092,623 | A | * | 7/2000 | Collavino | 182/3 |
| 6,101,631 | A | * | 8/2000 | Ferguson, Jr. | 2/94 |
| 6,125,966 | A | * | 10/2000 | Jones | 182/3 |
| 6,223,854 | B1 | * | 5/2001 | Nolz | 182/3 |
| 6,520,290 | B1 | * | 2/2003 | Carter | 182/3 |
| 6,658,666 | B1 | * | 12/2003 | Schweer | 182/3 |

* cited by examiner

*Primary Examiner*—Hugh B. Thompson, II
(74) *Attorney, Agent, or Firm*—Markell Seitzman

(57) ABSTRACT

An apparatus that secures a hunter to a tree while in a tree-mounted hunting stand that includes a safety harness assembly (200) having a belt retractor (24) and a body harness (16). The belt retractor is configured to be removably secured about the tree and removably secured to the body harness. The belt retractor along with energy-absorbing materials improves the hunter's safety while in tree stand and provides a sufficiently large range of motion about the stand.

8 Claims, 4 Drawing Sheets

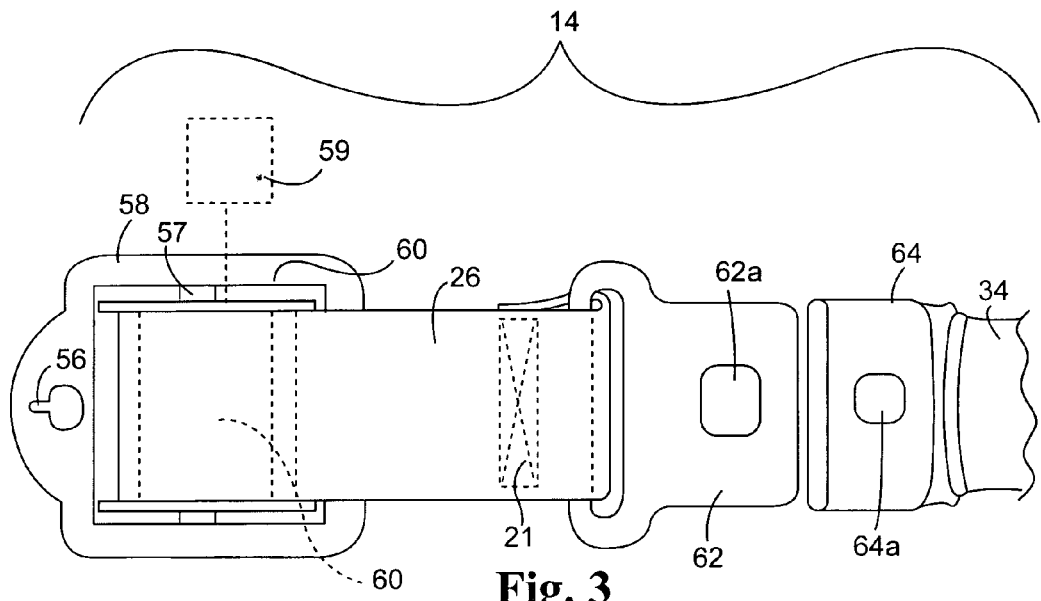
Fig. 3
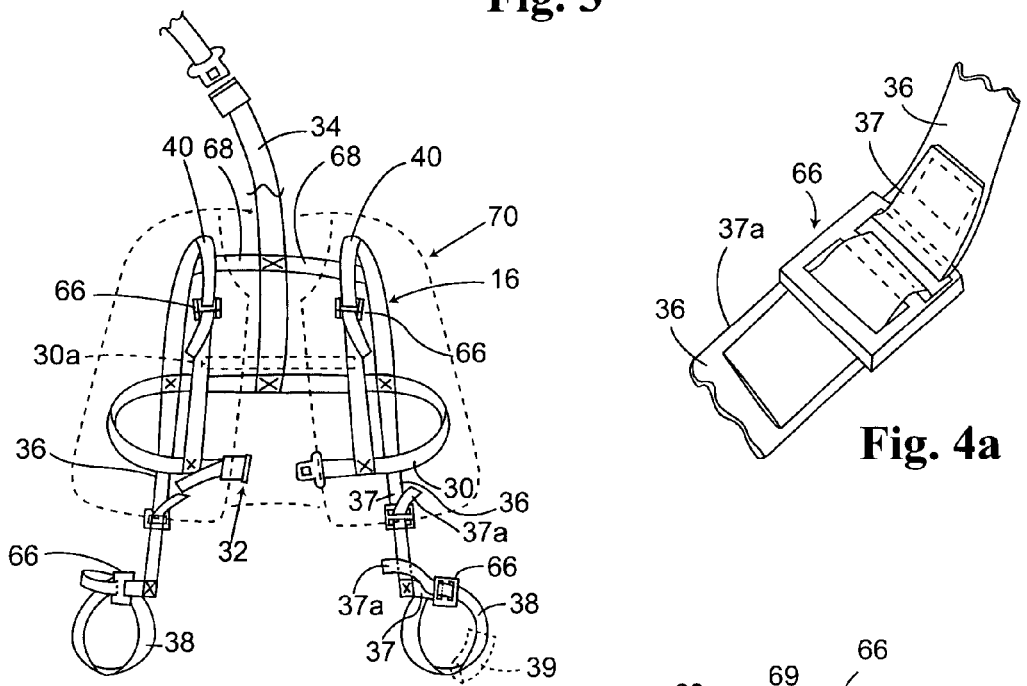
Fig. 4
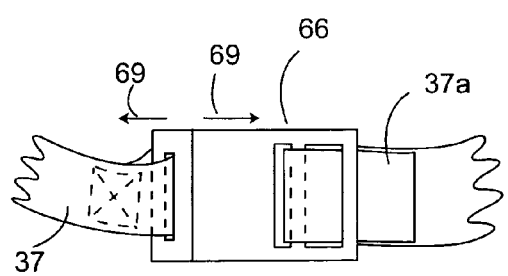
Fig. 4a
Fig. 4b

HUNTER'S SAFETY HARNESS FOR TREE STAND

This application claims the benefit of U.S. Provisional Application 60/440,958, filed on Jan. 17, 2003. The disclosure of the above application is incorporated herein by reference.

BACKGROUND AND SUMMARY OF THE INVENTION

The present invention relates in general to hunters' tree stands and more particularly to a safety harness that enables a hunter to be secured to a tree while in a tree-mounted tree stand.

Hunting stands are frequently used by hunters and commonly referred to as hunting blinds, tree stands, tree-mounted hunting stands, and the like. The hunting stands can take many forms; some exemplary forms include tree-mounted stands, ground-based stands, and self-supported hunting stands. Further tree stands offer various amenities contained within the stand; some exemplary amenities include seats, various stand adjustments, and mounting and storage locations for rifles, equipment and the like.

Many devices have been developed to secure the hunter in a hunting stand to improve hunter safety. As such, many devices address the scenario where the hunter installs the hunting stand above the ground. Examples of such installations include securing the hunting stand to a tree or constructing a self-supporting assembly to maintain the hunting stand above the ground. In the above examples, there is an important concern about the hunter falling from the tree stand to the ground. It is desirable to have a system allowing the hunter generally complete freedom of movement while in the tree stand. It is also desirable to provide a device that keeps the hunter safe if the hunter were to fall from the tree stand. Any safety harness must address and balance the competing interests of freedom of motion and safety during a fall.

Safety of the hunter remains the paramount concern while designing a safety harness. With that in mind, the design of a safety harness should also address many considerations such as efficiency, user-friendliness, and cost. A design of an efficient safety harness should address many factors such as preventing the hunter from falling from the stand, but also provide a comfortable and secure safety harness in the event of a fall from the stand. The design of a user-friendly harness should address many factors such as ease of use with regard to putting on and taking off the safety harness and ease of mounting the harness to the hunting stand or the tree. Any design, while providing for the safety of the hunter, must also balance the efficiency, the user-friendliness, and the cost to ultimately provide a desirable product.

In accordance with the preferred embodiment of the present invention, an apparatus is described that safely secures a hunter to a tree while in a tree-mounted hunting stand while providing the operational flexibility to move about or on the hunting stand. The apparatus includes a mounting assembly, a linking assembly, and a body harness. The mounting assembly includes a cinching clamp, a tree loop, and a mounting bracket. The linking assembly includes a retractor, a connector, and a belt. The body harness comprises a waist belt, a buckle, leg leads, knee loops, and shoulder straps. The mounting assembly is configured to be removably secured to the tree and to the linking assembly. The linking assembly is configured to be removably secured to the mounting assembly and to the body harness. The body harness is worn by the hunter and is provided to improve the safety of the hunter while in a tree stand.

Further areas of applicability of the present invention will become apparent from the detailed description and appended claims provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

FIG. 3 is a simplified view of a linking assembly of the safety harness of FIG. 1 showing a retractor, a belt, a connector and a portion of a tether line;

FIG. 4 is a view of a body harness of the safety harness of FIG. 1 showing a waist belt, a buckle, a tether line, leg leads or straps, leg bands or loops, and shoulder straps;

FIG. 4a shows details of an adjustment clasp;

FIG. 4b shows another exemplary adjustment clasp;

DETAILED DESCRIPTION OF THE DRAWINGS

Figure 1:
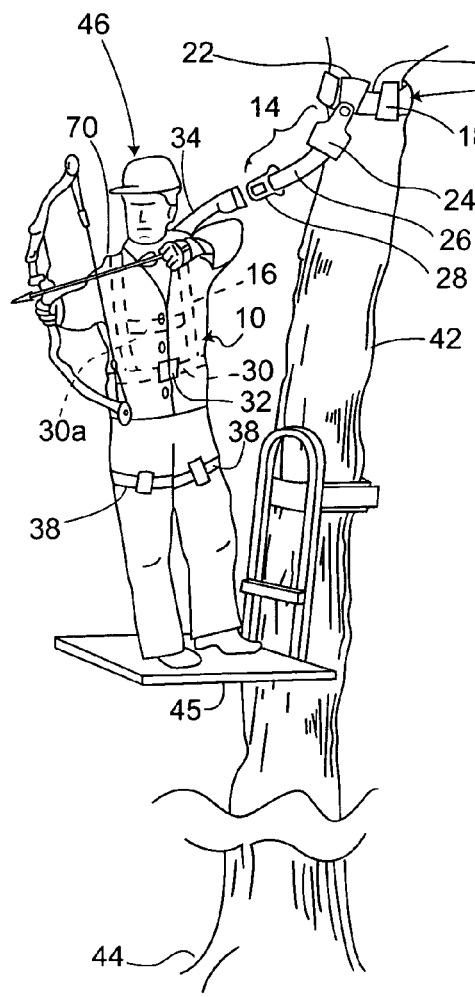
FIG. 1 is a diagrammatic view of a safety harness constructed in accordance with the teachings of the present invention diagrammatically showing the hunter's safety harness for a tree stand.

The following description of the preferred embodiments is merely exemplary in nature and is in no way intended to limit the invention, its applications, or uses.

Referring to FIGS. 1–4, there is shown an exemplary safety harness in accordance with a preferred embodiment of the present invention and generally indicated by reference numeral 10. The safety harness 10 includes a tree mounting assembly 12, a linking assembly 14, and a body harness 16. The tree mounting assembly 12 comprises a cinching clamp 18, a tree loop 20, and a mounting bracket 22. The linking assembly 14, which is configured to couple to the tree mounting assembly 12, comprises a retractor 24, a belt 26, and a connector 28. The body harness 16 (typically provided in conjunction with a wearable garment such as a jacket or vest 70), which is configured to be coupled to the linking assembly 14 and the tree mounting assembly 12, comprises an adjustable waist belt 30, an adjustable belt lock 32 such as a buckle or buckle and mating tongue, and a tether line 34. The body harness 16 further includes a right leg lead 36a and left leg lead 36b (collectively referred to hereinafter as the leg leads 36), a right leg band 38a and left leg band 38b (collectively referred to hereinafter as the leg bands 38) and a right shoulder strap 40a and left shoulder strap 40b (collectively referred to hereinafter as the shoulder straps 40).

In a preferred embodiment of the present invention the tree mounting assembly 12 may be removably secured to a tree 42 at a predetermined distance above the ground 44, typically proximate the location of a tree stand 45. The mounting bracket 22 and the tree loop 20 are positioned around the tree 42 and then secured with the cinching clamp 18, which allows the hunter to tighten the mounting assembly 12 against the tree 42. Tightening the tree loop 20 and the mounting bracket 22 against the tree provides a stable and a secure location to which the linking assembly 14 can be attached.

Figure 1A:
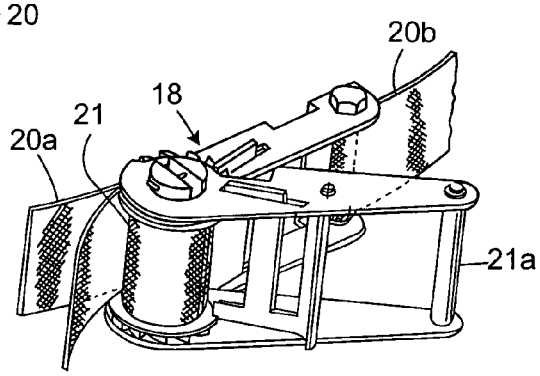
FIG. 1a shows a cinching clamp.

The cinching clamp 18 is a conventional tightening clamp as shown in FIG. 1a. In a preferred embodiment the cinching clamp 18 accepts both ends 20a, 20b of the tree loop 20 and allows a hunter 46 to reduce the diameter of the tree loop 20 by tightening or ratcheting the cinching clamp 18. The hunter 46 may also undo the cinching clamp 18 in a conventional way to remove the tree loop 20 from around the tree 42. Further, the cinching clamp 18 may be tightened by hand or the hunter 46 can use any suitable additional items such as a conventional lever arm to provide additional mechanical advantage. Typical cinching clamps 18 will include a rotatable spool 21 about which a free end of the tree loop is received and is rotated about a spool ratcheted by the lever 21a.

The cinching clamp 18 is preferably constructed of a suitable metal such as stainless steel or alternatively aluminum. One skilled in the art will readily appreciate the cinching clamp 18 can be made of many materials that are suitable for use outdoors and which also provide the necessary material strength for the application. Additional exemplary materials include brass, titanium, plastic, or the like.

The tree loop 20 is preferably constructed of a conventional nylon or polyester mesh belt (such as used as a woven seat belt in automotive applications). One skilled in the art will readily appreciate the tree loop 20 can be made of many different materials, such as synthetic polymers, organic materials, or other suitable metals.

Figure 2A:
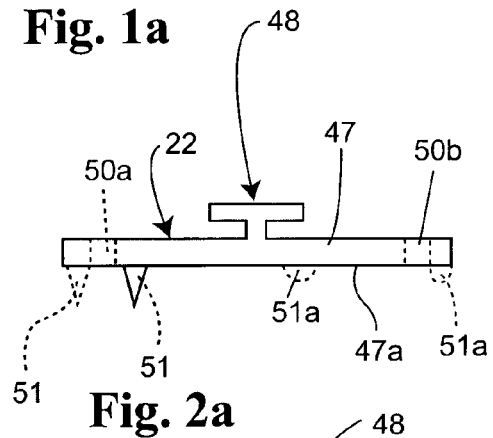
FIG. 2a is a side view of the mounting bracket of the mounting assembly of FIG. 2 showing a mounting post.
Figure 2B:
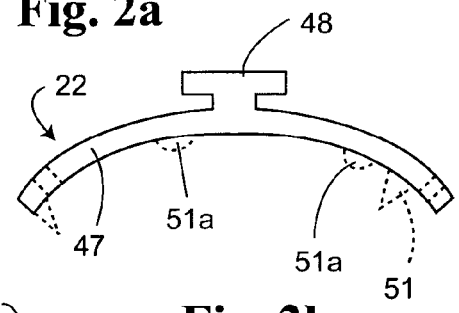
FIG. 2b is a side view of another mounting bracket.
Figure 2:
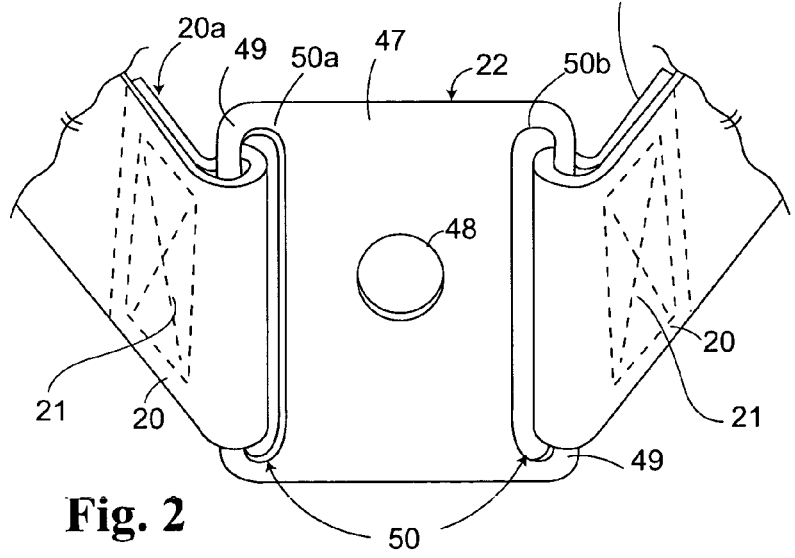
FIG. 2 is partial front view of a mounting assembly of the safety harness of FIG. 1 showing a mounting bracket and a portion of the tree loop.

Referring to FIGS. 1, 2a, and 2b, the mounting bracket 22 is shown in accordance with the preferred embodiment of the present invention. The mounting bracket 22 includes a mounting post 48, which extends from a mounting plate 47. A right tree loop slot 50a, and a left tree loop slot 50b, which are collectively referred to hereinafter as tree loop slots 50, are each formed on opposite sides of the mounting plate 47. Ends 20a and 20b of sections of the tree loop 20 are fit within a respective slot 50a and 50b and looped about an end bar 49 of the mounting plate 47. The section ends can be secured in place by a fastening mechanism 21 such as a plurality of sewn stitches or a rivet or other means. The mounting post 48 includes a standoff portion 52 and an end cap 54. The standoff portion 52 can be formed by a cylindrically shaped pin or post. The mounting post 48 is a conventional male-portion of a keyhole slot assembly, such that the end cap 54 has a larger diameter than the standoff portion 52.

The mounting bracket 22 is preferably made of stainless steel or any suitable material that is able to withstand being outdoors for long periods of time. One skilled in the art will readily appreciate that the mounting bracket 22 can be made of many suitable materials; a few exemplary materials include aluminum, brass, or plastic. Further, mounting bracket 22 is preferably a generally flat piece of metal. The mounting bracket 22, however, can also be curved in one or more axes to better match the contour of the tree 42. Further, the tree loop 20 may be comprised of additional components that provide more friction when the tree loop 20 is attached to the tree 42. The mounting bracket 22 may contain spikes 51 or bumps (projections) 51a (as shown in phantom line in FIG. 2b), as noted above, to further facilitate a secure fit against the tree 42. The spikes or bumps extend from a rear surface 47a of the mounting plate 47. The spikes or projections can be permanently secured to the mounting plate such as being formed as a stamped spike or projections or removably mounted thereon such as being threadably mounted to the mounting plate 47.

The mounting assembly 12 is installed by the hunter 46 around the tree 42 so the mounting bracket 22 is accessible to the hunter 46, while in the hunting stand 45. Once the hunter 46 has installed the mounting assembly 12 to the tree 42, the hunter will connect the linking assembly 14, and more particularly the retractor 24, to the mounting assembly 12.

Referring to FIGS. 1 and 3, the linking assembly 14 is shown in accordance with the preferred embodiment of the present invention. The linking assembly 14 comprises the retractor 24, the belt 26, and the connector 28. The retractor 24 is a modified emergency locking (ELR) seat belt retractor having a retractor frame with a keyhole opening or slot 56. As is known in the art, seat belt retractor 24 includes a cylindrical belt reel or spool 60 rotatably mounted on bearing or bushings 57 to the retractor frame 58 for coiling and uncoiling the belt 26. The spool or reel 60 is stopped by a lock mechanism 59, which is diagrammatically shown in FIG. 3. In the present application the lock mechanism 59 comprises an inertia sensor such as a web sensor, a lock pawl (or lock bar or lock dog), which is brought into contact with teeth on a lock wheel associated with the reel 60. The belt reel is spring loaded, in a belt rewind direction, by a rewind spring (not shown).

One skilled in the art will readily appreciate many seat belt retractor devices can be used in the present invention. One will further appreciate the application of a seat belt retractor in the present invention does not necessitate the use of a vehicle deceleration sensor commonly found in seat belt retractors. Nevertheless, a modified seat belt web sensor is necessary for the proper operation of the present invention. One such exemplary seat belt retractor is shown in U.S. Pat. No. 6,283,391, which is commonly assigned and hereby incorporated by reference in its entirety as if fully set forth herein. The web sensor mechanism within the retractor will initiate the locking-up of the retractor when the belt 60 is being unwound (protracted) from the spool at a level (rate or acceleration) in excess of a predetermined level. This rapid unwinding of the spool would occur as the hunter starts to fall or falls from the tree stand. In the present invention the web sensor mechanism is set to initiate the locking up of the reel 60 when the belt 26 is unwound therefrom at an acceleration at or above about 0.5 g–1.5 g. The typical web sensor of an automotive seat belt retractor will initiate the locking up of the retractor at or above 1.5 g.

With continuing reference to FIGS. 1 and 3, the belt 26 in normal use is rewound onto the spool with most of the belt 26 wrapped around the belt reel 60. The connector 28 comprises a first latch component such as a male latch 62 and cooperating, mating second latch component such as a female latch 64. In the preferred embodiment the male latch 62 comprises a seat belt tongue of known design. Seat belt tongues are also referred to as latch plates. The female latch comprises a seat belt buckle (of known design). Seat belt buckles and tongues are designed to stay mated even when subjected to high tensile forces. The latch plate includes a lock feature such as an opening 62a that fits into the buckle 64, which contains a mating lock feature 64a such as an interfitting projection. One or the other of the male end 62 or female end 64 is connected to the free end 26a of the belt 26 and the other end is secured to the tether line 34 (which extends to the vest). The length of the belt 26 is dependent upon the capacity of the belt reel 60 and can be sized to a suitable amount based on the needs of the individual application. The tether line should at least be sufficient to permit the hunter to move freely about a reasonably sized tree stand.

Referring to FIGS. 1 and 4, the body harness 16 is shown in accordance with the preferred embodiment of the present invention. The body harness 16 comprises the adjustable and lockable waist belt 30, the adjustable belt lock 32 (buckle or buckle and mating tongue), the tether line 34, the leg leads 36, the leg bands 38, and the shoulder straps 40. The harness can be manufactured as illustrated or incorporated into a garment such as a vent 70 (shown in phantom line in FIG. 44). The body harness 16 has many adjustment points that allow the body harness 16 to be worn by hunters of various sizes. In the preferred embodiment, adjustment clasps 66 can be found at various locations on the body harness 16. While for purposes of explanation one adjustment clasp will be discussed, as mentioned, the body harness 16 contains a plurality of adjustment clasps 66 and, as such, are hereinafter collectively referred to as the adjustment clasps 66.

FIG. 4a shows an exemplary adjustment clasp interposed in a belt, band or lead section, wherein one end of the belt, band or lead such as 37 is fixedly secured to the clasp 66 and another end 37a is adjustably secured to the clasp 66. The adjustment clasp 66 can be of a one-piece construction as shown in FIG. 4a or of a two-part, interlocking construction, permitting adjustment of the length of the belt, band or lead while also permitting disengagement of the two parts of the clasp 66 (see arrow 69).

One skilled in the art will readily appreciate the adjustment clasps 66 can be located at convenient locations on the body harness 16 to accommodate various sized hunters. It will be further appreciated the exact location of the adjustment clasps 66 may vary along the various body harness 16 locations as a particularly sized hunter adjusts the body harness 16. Many components of the body harness 16 comprise adjustment clasps 66, such as the adjustable waist belt 30, the adjustable belt lock 32, the leg leads 36, the leg bands 38, and the shoulder straps 40.

The adjustment clasps 66 are conventional cinch type clasps that allow the hunter 46 to pull on the clasp to loosen the body harness 16 components or pull on the belt that is threaded through the clasp to re-tighten and ultimately re-size the various harness components until an appropriate size is reached. It should be further appreciated the adjustment clasps 66 may be sufficiently large to allow a hunter 46 to operate the clasp while wearing gloves. Further, the adjustment clasps 66 can be made of ABS plastic, but the material of the adjustment clasps 66 can vary to accommodate the demands of the present invention.

In various embodiments, the leg bands 38 are secured about the upper thighs of the hunter or about the knees. The leg bands 38 are comprised of conventional material (a woven polymer webbing or a polymer film of nylon or polyester). The leg bands 38 can be preformed into loops of a determinable size or formable into loops of various sizes by the hunter. If the leg bands 38 are formed into fixed sized loops this can be obtained by forming a loop in the webbing and sewing the loop closed. Alternately, a variable sized loop can be formed by including an adjustment clasp 66 in each leg band 38. The adjustment clasps 66 can be used to adjust the diameter of the leg bands 38 to fit various sized hunters. It should be appreciated the leg bands 38 may comprise additional material to improve the comfort of the leg bands 38 for the hunter 46. To that end, padding (see phantom line 35 in FIG. 4) or other comfort providing material can be used along with the leg bands 38, whereby the webbing of the leg bands 38 is threaded through the padding or the like and then adjusted with the adjustment clasps 66 to the appropriate size.

Each leg lead 36 connects to a corresponding leg band 38 to the (adjustable) waist belt 30. Each leg lead 36 comprises conventional nylon webbing and further includes adjustment clasp 66. The adjustment clasps 66 permit the length of the leg leads 36 to be varied by the user to accommodate various sized users. One end of each leg lead 36 is sewn into the adjustable waist belt 30 in a conventional manner. It will be appreciated, however, that the leg leads 36 may be connected to the waist belt 30 in many different ways. One such way is to sew the ends of the leg leads 36 into a loop with a conventional D-ring 71 (see FIG. 8) disposed within the loop. Additional nylon webbing is also sewn in a loop and attached to the adjustable waist belt 30 with the same D-Ring disposed within the loop; thereby, connecting the leg leads 36 to the adjustable waist belt 30, with the intervening D-Ring. In the preferred embodiment the leg leads are secured to the waist belt 30 at the rear of the waist belt.

Each of the two shoulder straps 40 forms a respective loop and extends from a front portion of the waist belt 30 to a rear portion of the waist belt in a manner similar to a suspender strap. Each shoulder strap may include an adjustment clasp 66. Each adjustment clasp 66 permits the length of a shoulder strap to be changed. The shoulder straps 40 are secured to the waist belt 30 in a conventional manner such as by sewing or riveting and may also be connected to the waist belt 30 in a manner outlined above for the leg leads 36.

The tether line 34 is further comprised of link straps 68 (see FIG. 4). The link straps 68 connect the shoulder straps 40 to the tether line 34. The link straps 68 may be sewn into the shoulder straps 40 and the tether line 34 in a conventional manner but may also be connected in any other suitable manner. Using the above configuration will keep the hunter in an upright configuration should he fall from the tree stand.

The tether line 34 can be made of energy-absorbing materials. One such exemplary energy-absorbing material is comprised of a load-limiting yarn, such that when a certain load is applied to the material it will elongate accordingly. It is envisioned the energy-absorbing material, comprising load-limiting yarn, will elongate when subjected to a load of approximately 400 pounds (1780 Newtons). One such exemplary energy-absorbing material is disclosed in U.S. Pat. No. 6,340,524, which is hereby incorporated by reference in its entirety as if fully set forth herein.

In the preferred embodiment of the present invention the belt 26 of the linking assembly 14 (FIGS. 1 and 3), along with the tether line 34, are comprised of energy-absorbing material. One such exemplary energy-absorbing material is the load-limiting yarn noted above. In an alternative preferred embodiment, only the belt 26 of the linking assembly 14 is comprised of the energy-absorbing material. One skilled in the art will readily appreciate many forms of energy-absorbing material can be used throughout the present invention and implemented in various safety harness components to improve the safety of the hunter.

Another exemplary energy-absorbing material comprises forming the webbing 26 or the tether line into tearable loops, which is another technique used in the seat belt art. These tearable loops comprise overlapping layers sewn together with a thread designed to rip and ultimately break under a given force. The ripping and ultimate breaking of the threads that hold the overlapping layers together absorbs energy as the overlapping layers are pulled apart. The rip stitching in the tether line 34 is used in a conventional manner wherein the stitches rip apart under a force of approximately 200 pounds (890 Newtons). It should be appreciated the force required to rip the stitches apart can be sized appropriately to accommodate various sized hunters and other application specific needs.

Figure 5:
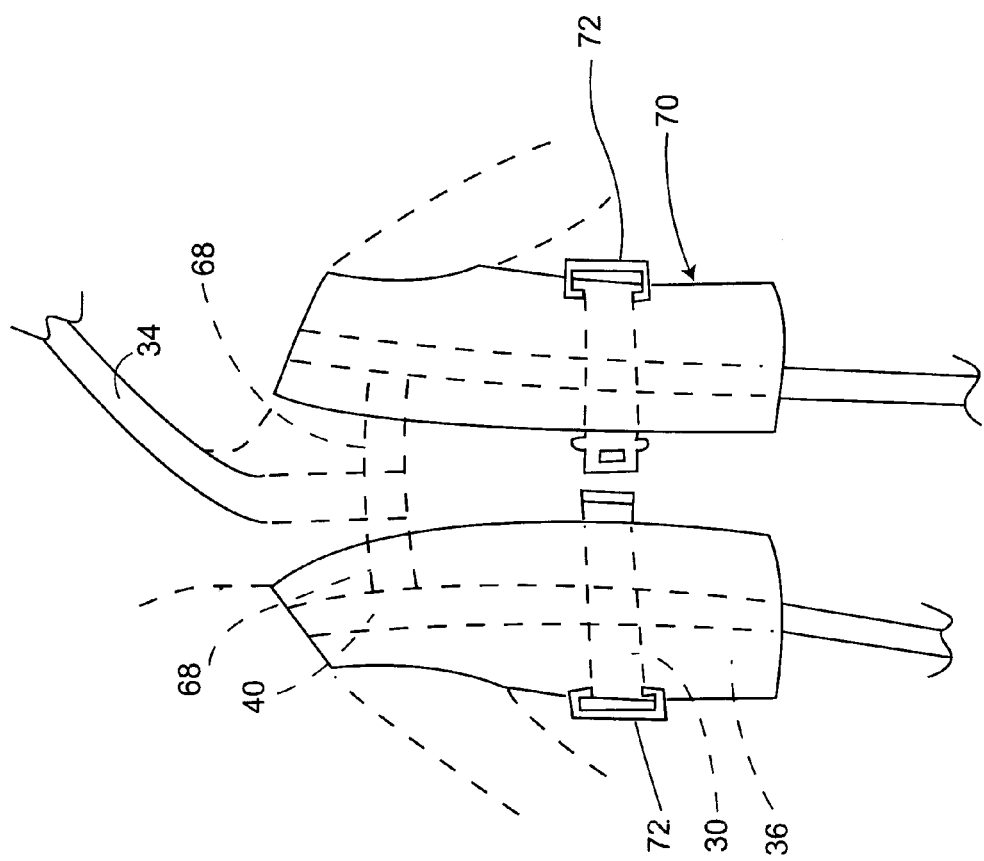
FIG. 5 is a figure showing a hunter's vest with the body harness sewn within the vest and partially concealed by the vest.

Referring to FIGS. 1 and 5, the body harness 16 is shown integral to a hunter's vest 70. In the preferred embodiment, the adjustable waist belt 30 is threaded into the hunter's vest 70 so the material of the hunter's vest partially conceals the adjustable waist belt 30. The adjustable waist belt 30 is also shown with the adjustable buckle 32. The adjustable buckle 32 allows the hunter 46 to tighten the adjustable waist belt 30 in a manner similar to the adjustment clasps 66 mentioned above.

Also shown in FIG. 5 are D-Rings 72, through which the adjustable waist belt 30 is threaded. The D-Rings 72 may be used as an accessory attachment point, an additional point through which to thread an additional equipment belt or the like.

It should be appreciated by one skilled in the art, the hunter's vest 70 can be substituted for many other forms of outerwear. Other such exemplary forms of outerwear include coats, jackets, long-johns, foul-weather gear, or the like. It should be appreciated further that any such choice of outerwear can be easily integrated with the safety harness 10, and further used to partially conceal the body harness 16.

In the preferred embodiment of the invention the safety harness 10 is connected about a tree 42 (see FIG. 1). It should, however, be appreciated the safety harness 10 may easily be connected to other structures, such as self-supported tree stands, poles, or the like. It should further be appreciated that the safety harness 10 may easily be adapted to other applications, such as a safety harness for scaffolding.

When used in a outdoor sports or hunting environment the user will put on the vest 70, which includes the body harness 16. The mounting assembly 12 is placed about and secured to a support such as a tree above the location of a tree stand. The linking assembly 14, comprising the retractor 24 is secured to the mounting assembly 12 and the body harness 16 connected thereto. Alternately, the body harness 16 can be connected first to the linking assembly 14 and then the linking assembly secured to the mounting assembly. While the safety harness 10 is designed to improve a hunter's safety while in a tree stand while permitting the hunter an adequate range of movement about the stand, as can be appreciated, no device that provides a large range of motion will prevent the hunter from accidentally falling from the tree stand in all conditions.

As mentioned above, the web sensor 59 of the retractor is set at a relatively low (or sensitive) value of about 0.5 g (but such value may approach 1.5 g). At a level within this range the web sensor 59 will cause the retractor to lock up as the hunter begins to fall, thereby preventing the hunter from falling from the stand. With the retractor locked, the hunter will recover from the fall and relocate himself or herself to a safe portion of the tree stand.

If the hunter were to fall, the safety harness 10, as outlined above, provides many devices to improve the safety of the hunter. As noted above, the belt retractor 24 will lock at a suitable point when the belt reel 60 begins to uncoil, stopping the fall. The energy-absorbing materials will buffer reaction forces input to the wearer of the vest (the hunter) via the harness 16, slowing the fall and ultimately stopping the downward motion of the hunter.

The hunter may use the leg bands 38 in the following ways. In one scenario, as shown in FIG. 4, as soon as the hunter dons the vest 70 and secures the vest to the tree (via the mounting and linking assembly 12 and 14) the hunter loops and tightens the leg bands 38 about his thighs. In this manner the leg bands act as crotch straps. If the hunter becomes dislodged from the tree stand he will be suspended by the tether 34 as the retractor 26 will remain in a locked condition until the forces on the belt 26 are relieved. In this condition the hunter's weight is reacted against by the waistband 30 or openable chest band 30*a*, if used. The leg bands 38 will transfer the forces from the hunter's chest or waist to the legs, relieving the forces acting on the waist and chest, which is more comfortable for the hunter. While there are benefits to always wearing the leg bands 38 they can be constricting and uncomfortable.

Figure 6:
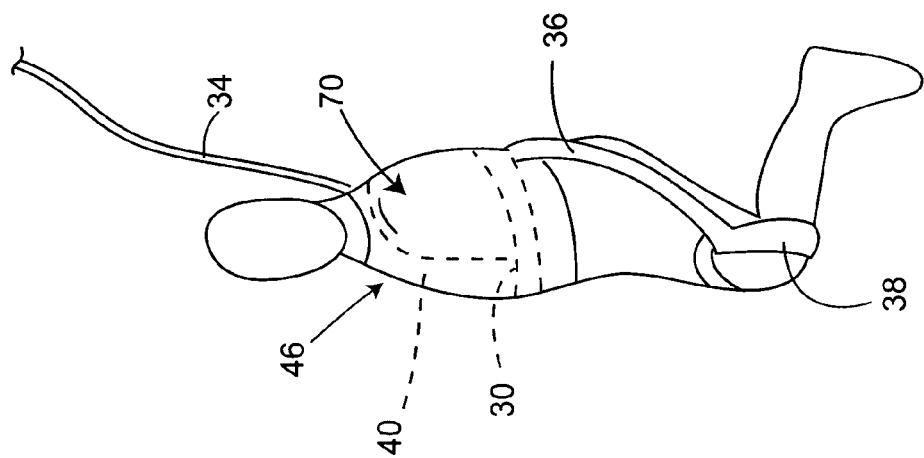
FIG. 6 shows the use of leg bands of the present invention.

Reference is made to FIG. 6, which shows an alternate use of the leg bands of the present invention. In this scenario the vest is worn but the leg bands 38 are not secured about the legs of the wearer (hunter) but left loose and dangling down from the vest 70 (or waistband 30). The leg leads 36 adjust so the leg band (in the form of a preformed loop) is located at slightly above or at the knee of the hunter. Should the hunter fall from the tree stand, the retractor will prevent the hunter from falling to the ground and leave the hunter suspended, in an upright condition, on the tether 34. Once the hunter regains his (or her) composure, the hunter bends each leg at the knee (and if needed bends a corresponding thigh to lift the knee), takes each leg band 38 (formed as a loop) and loops the band 38 about the bent knee and thereafter straightens the thigh to tension the leg lead 36. The tensioning of the leg lead transfers the weight of the hunter from the waist or chest strap to the knees of the hunter. The hunter should be able to stay in this position, with the leg bands about his knees, indefinitely until help arrives or if he chooses until he climbs up the tensioned tether 34 to the tree stand.

Figure 7:
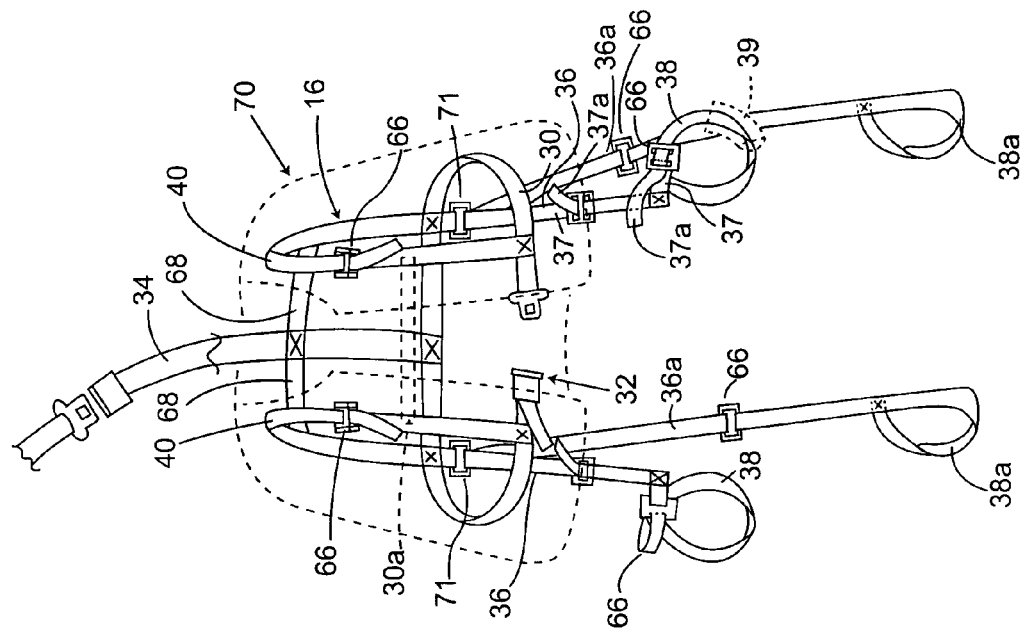
FIGS. 7–9 show other embodiments of the invention.
Figure 9:
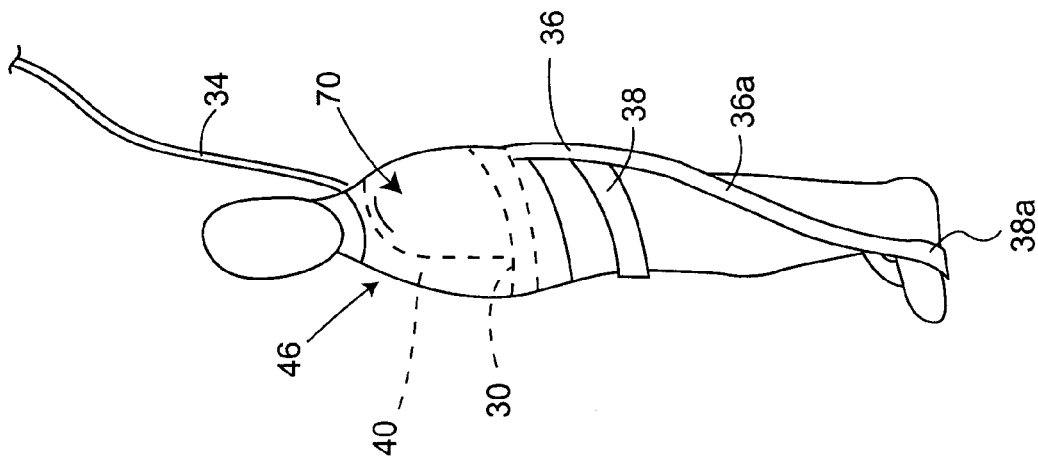
Figure 8:
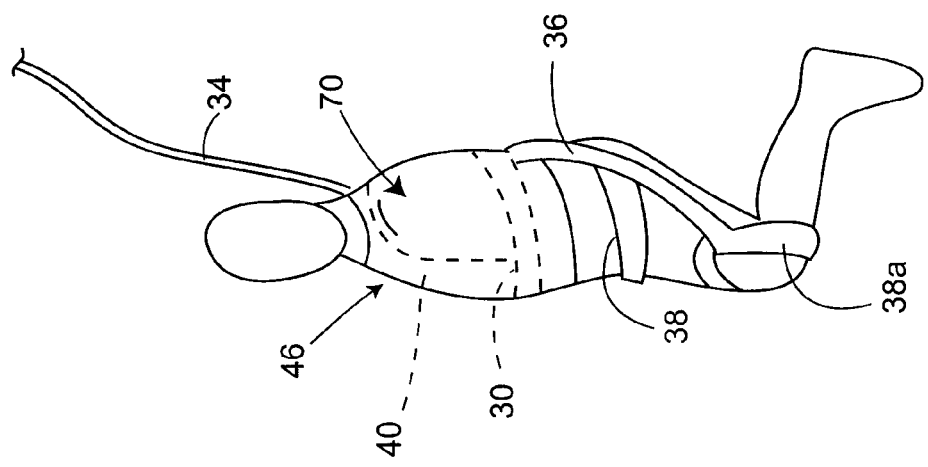

Reference is made to FIGS. 7–9, which illustrate an alternate embodiment of the present invention. As can be seen, FIG. 7 is substantially identical to the safety harness shown in FIG. 4 with the addition of two leg leads or straps 36*a* and two corresponding leg bands or loops 38*a*. The two leg bands 38 are secured about the upper thighs of the hunter 46, as discussed above, and the leg leads or straps 36 appropriately tightened to remove slack in the straps 36. In this embodiment the additional leg leads 36*a* and bands 38*a* are not used until an emergency. In such an emergency, as shown in FIG. 8, that is with the hunter displaced from the tree stand, the leg straps 36 and bands 38 (about the thighs) adequately support the hunter.

Subsequently, the hunter and can manipulate each loop 38*a* about one of his bent knees. After both of the loops 30*a* are secured about a corresponding knee, the hunter can rotate the upper thigh downwardly so as to tension the leg band 36*a* in a manner as discussed in conjunction with the embodiment illustrated in FIG. 6. In this manner the hunter can slightly elevate his torso, thereby eliminating most of the reaction forces developed by the safety harness at its connection with the upper thigh, chest and shoulders. It should be appreciated the length of the leg straps 38*a* is sized to be sufficiently short such that when the upper thigh is rotated to a normal standing position such rotation will tension these straps.

Reference is briefly made to FIG. 9, which shows a different embodiment of the invention. The harness used in FIG. 9 is substantially as shown in FIG. 7 with the exception the length of each of the leg straps 36a is sufficiently long to permit the hunter, after his fall (from his perch or tree stand), to insert each boot (or foot) within a loop 38a, thereby permitting the hunter to stand upright supported by the loop(s) 38a and strap(s) 36a. As can be appreciated, when in this upright position the hunter might easily pull himself or herself back onto the tree stand 45.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An apparatus to secure a user thereof to an elevated perch, comprising:
    a safety harness assembly wearable by the user, the assembly having a lockable retractor, a body harness and a belt extending therebetween, wherein the retractor is configured to become locked to prevent extension of the belt from the retractor in response to rapid movement of the user;
    wherein the retractor is configured to be removably secured to a support proximate the perch and adapted to improve the safety of the user while in the perch;
    wherein the body harness is releasably secured to the retractor; and
    wherein the belt retractor includes an inertia sensor for initiating lock-up of the retractor.

2. The apparatus as defined in claim 1 wherein the inertia sensor is set to initiate lock-up of the retractor as the belt is withdrawn from the retractor at a determinable rate or acceleration.

3. The apparatus as defined in claim 1 wherein the body harness is releasably secured to the retractor.

4. The apparatus as defined in claim 1 wherein the harness includes two sets of leg bands.

5. The apparatus as defined in claim 4 wherein one set of leg bands is securable about a thigh region of the user and wherein the second set of leg bands is movable to receive one of a knee or foot after the user has been dislodged from the perch.

6. The apparatus as defined in claim 1 including at least one leg band securable about portions of the legs of the user, each leg band configured into a loop hanging freely from the body harness a distance below the safety harness, to enable the hunter to put his knee, leg or foot into the loop after the hunter has been dislodged from the perch.

7. The apparatus as defined in claim 6 wherein each leg band is configured so the distance between the loop and the body harness is settable by the user.

8. The apparatus as defined in claim 6 wherein each leg band includes at least one loop.

* * * * *